Sept. 6, 1949.  R. G. PARR ET AL  2,481,235
ROTARY JET-ACTUATED MOTOR

Filed June 18, 1946  2 Sheets-Sheet 1

Inventor
Ralph G. Parr &
Samuel D. Parr
By McMorrow, Berman & Davidson
Attorney

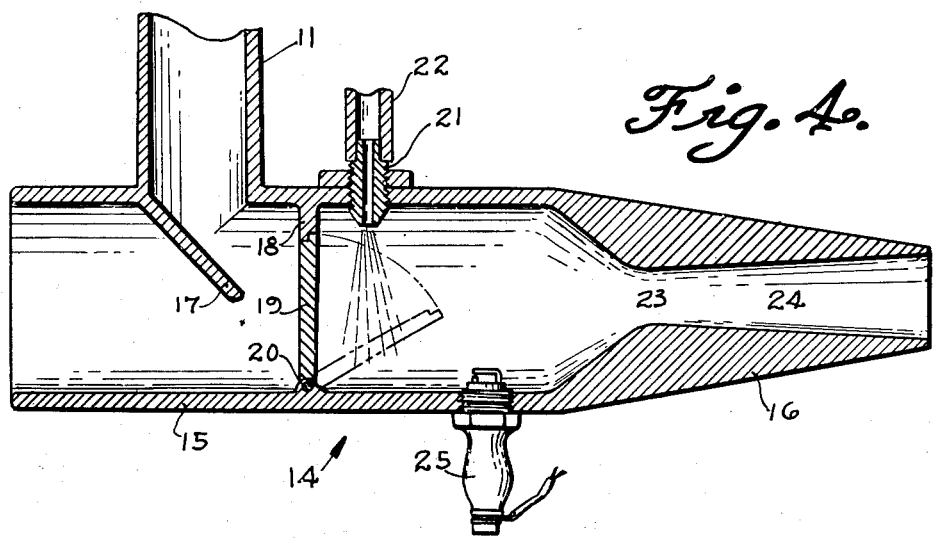
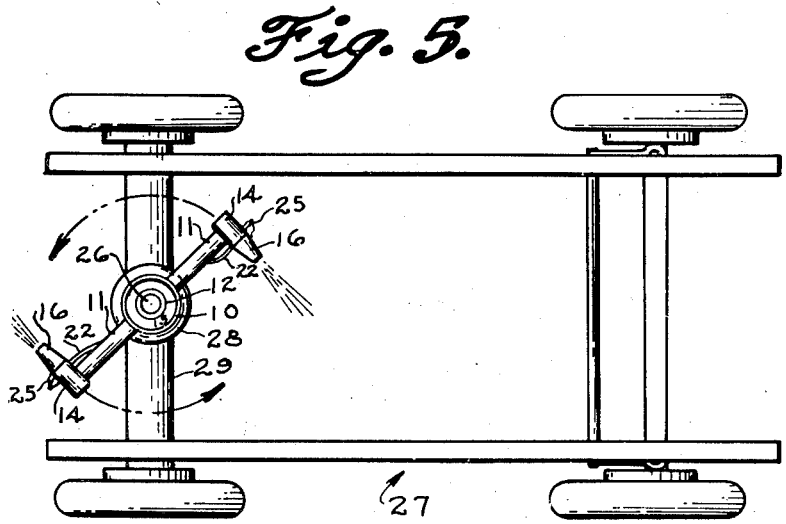

Patented Sept. 6, 1949

2,481,235

UNITED STATES PATENT OFFICE 2,481,235

ROTARY JET-ACTUATED MOTOR

Ralph G. Parr and Samuel D. Parr,
Auburn, Wash.

Application June 18, 1946, Serial No. 677,442

3 Claims. (Cl. 60—41)

Our invention relates to motors and more particularly to rotary motors.

The object of our invention is to provide a motor adapted to develop an exceptional big power per pound of its dead weight.

Another object of our invention is to reduce the number of precision parts of a motor to the utmost.

A further object of our invention is to provide a motor having very few moving parts and requiring in consequence very little attention relative to oiling and maintenance.

Other objects of our invention may appear in the following specification describing our invention with reference to a preferred embodiment of our invention.

It is however to be understood that our invention is not to be limited or restricted to the exact construction and combination of parts described in the specification and shown in the drawings, but that such changes and modifications can be made, which fall within the scope of the claims appended hereto.

In the drawings:

Figure 4 is a sectional detail view in a larger scale taken on line 4—4 in Figure 2.

Figure 5 is a top plan view of a motor according to our invention mounted on the stripped body of a vehicle.

Figure 1:
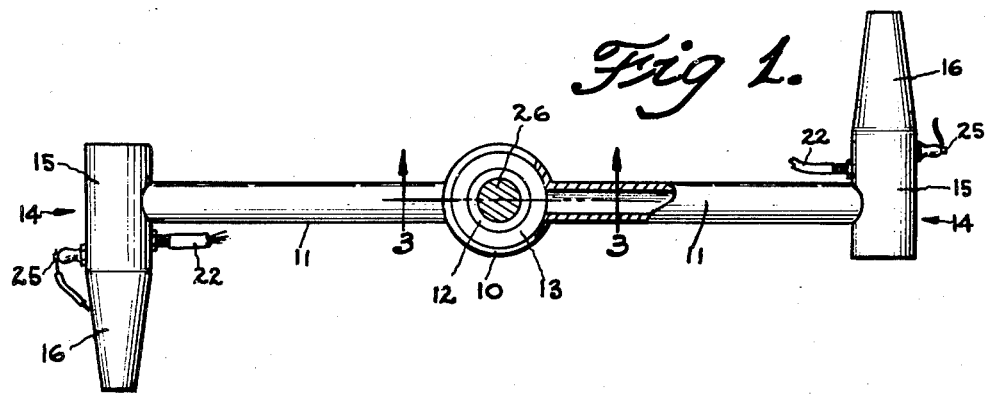
Figure 1 is a top plan view of a rotary engine according to our invention.
Figure 2:
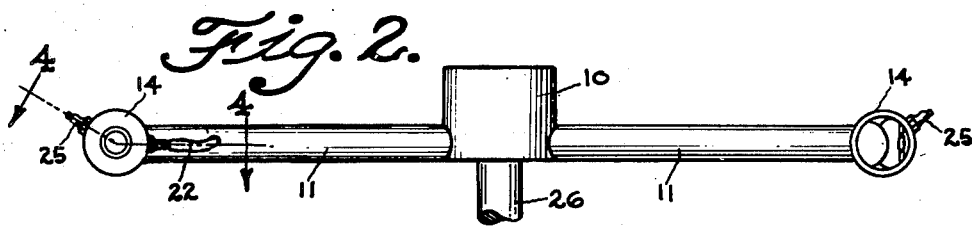
Figure 2 is a side elevational view of the engine according to our invention.
Figure 3:
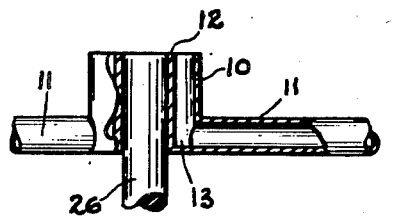
Figure 3 is a sectional view taken on line 3—3 in Figure 1.
Figure 6:
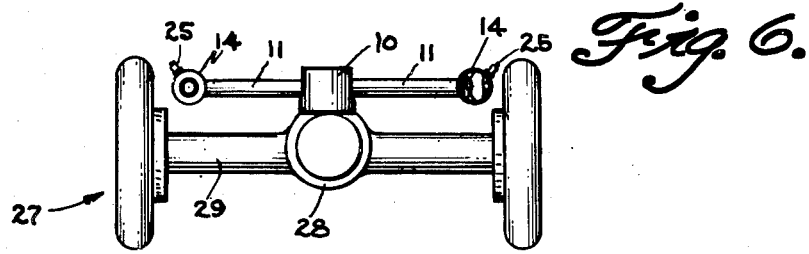
Figure 6 is an end view of Figure 5.

Referring now in detail to the drawings the rotary motor according to our invention has a hollow body consisting of a cylindrical central portion 10. Two hollow pipe-like arms 11 extend diametrically from the cylindrical body 10 in opposite directions and communicate with the interior of said body. Inside the body 10 a cylindrical wall 12 extends upwardly from the annular bottom 13 of the body 10 and is arranged concentrically with the cylindrical body wall 10.

On the outer end of each hollow arm 11 a thrust nozzle 14 is arranged. Each of these thrust nozzles has a hollow cylindrical main portion 15 and a hollow rear portion 16, which is formed conically on the outside.

The body 10, the two pipe-like hollow arms 11, and the thrust nozzles 14 are preferably made as one integral unit, but they can be produced individually and assembled securely with each other in any desired conventional manner.

Each hollow arm 11 enters the corresponding cylindrical main portion 15 of a thrust nozzle 14 at a distance rearwardly of its front end. A baffle 17 is formed integrally with each main thrust nozzle portion 15 and is arranged inside thereof so that it extends inwardly and rearwardly from the forward edge of the joint formed by the main thrust nozzle portion 15 and the hollow arm 11 connected therewith.

At a small distance rearwardly of the rear edge formed by each hollow arm and the main nozzle portion thereon an inwardly extending stop flange 18 is integrally formed with the main nozzle portion 15 and is provided with an offset inner edge thereon. Opposite of this stop flange 18 a valve flap 19 is hingedly mounted on the wall of the main nozzle portion 15 as shown at 20 in Figure 4. The free edge of this flap 19 is also off-set so that it will engage the off-set inner edge of the stop flange 18.

Rearwardly of and adjacent to the valve construction described above a fuel inlet nipple 21 is inserted in and extends through the wall of the main nozzle portion 15. The connection between this nipple and the nozzle is to be air-tight.

A tube 22 of any suitable kind and material is connected with the nipple and leads to and communicates with a source of fuel (not shown) in any well known and conventional manner. The nipple 21 is preferably arranged in the inside portion of the circumferential wall of the nozzle portion 15.

The inner bore of the main portion 15 of each thrust nozzle 14 is substantially cylindrical, but approximately there, where the outer outline starts to taper toward the rear, the bore tapers also inwardly so that a narrow passage portion 23 is formed. Rearwardly of this narrow passage portion the bore of the nozzle flares outwardly as plainly shown at 24 in Figure 4.

A spark plug 25 is inserted in and extends through the wall of each main nozzle portion 15. It is located adjacent the beginning of the tapering of the nozzle bore and is preferably arranged in the outside portion of the cylindrical part of the nozzle wall.

Each spark plug 25 is connected with a source of electricity (not shown) in any preferred, well known and conventional manner.

The rotary motor described above is rigidly connected with a shaft 26 which enters the inner chamber formed by the circular wall 12. This shaft can be connected with the transmission of an automobile 27 which is arranged in a housing 28 on the housing 29 of the rear axle of the automobile.

The motor according to our invention operates as follows:

Air is taken in through the centrally located annular chamber 13, flows through the hollow arms 11 and is directed toward the valve flaps 19 by the baffles 17. Fuel is fed into the nozzle through the tube 22 and the nipple 21 and is mixed with the air entering through the valve 19. The space in rear of the valve forms the combustion chamber. The gases of combustion are expelled through the rear end of the nozzle 14 in jet-form, rotating the motor and the shaft 26 rigidly connected therewith. A clutch (not shown) is also arranged in the transmission housing 28.

It is to be understood that the rotary jet-actuated motor according to our invention may be connected to drive not only an automobile as shown and described, but that it can be used for the purpose of driving the propellers of an aeroplane or a boat or for other purposes.

The forward end of the thrust nozzle 14 can be open and can thereby be used to take in additional air to be mixed with the fuel, or it can be closed. The decision depends on the purpose for which the motor is to be used and on the fuel with which the motor is to be driven.

Having described our invention we claim as new and desire to secure by Letters Patent:

1. A rotary engine adapted to be rigidly connected with a rotatably mounted shaft including a centrally located air chamber, a hollow arm radially extending from the chamber and a nozzle firmly connected with the arm and extending at right angles thereto, the hollow arm being adapted to conduct air from the centrally located chamber into the front portion of the nozzle, a valve arranged inside the nozzle rearwardly of the air inlet, a fuel inlet in the wall of the nozzle rearwardly of the valve, and a spark plug extending through the nozzle wall rearwardly of the fuel inlet, and a baffle inside the nozzle and adapted to direct air flowing through the hollow arm toward the valve and through the valve past the fuel intake to mix with the fuel entering there.

2. A rotary engine adapted to be rigidly connected with a rotatably mounted shaft including a centrally located air chamber, a hollow arm radially extending from the chamber and a nozzle firmly connected with the arm and extending at right angles thereto, the hollow arm being adapted to conduct air from the centrally located chamber into the front portion of the nozzle, a valve arranged inside the nozzle rearwardly of the air inlet, a fuel inlet in the wall of the nozzle rearwardly of the valve, and a spark plug extending through the nozzle wall rearwardly of the fuel inlet, and a baffle inside the nozzle and adapted to direct air flowing through the hollow arm toward the valve and through the valve past the fuel intake to mix with the fuel entering there, the walls of the nozzle converging conically towards each other, restricting the bore of the nozlle rearwardly of the spark plug and forming a combustion chamber in the nozzle.

3. A rotary engine adapted to be rigidly connected with a rotatably mounted shaft including a centrally located air chamber, a hollow arm radially extending from the chamber and a nozzle firmly connected with the arm and extending at right angles thereto, the hollow arm being adapted to conduct air from the centrally located chamber into the front portion of the nozzle, a valve arranged inside the nozzle rearwardly of the air inlet, a fuel inlet in the wall of the nozzle rearwardly of the valve, and a spark plug extending through the nozzle wall rearwardly of the fuel inlet, and a baffle inside the nozzle and adapted to direct air flowing through the hollow arm toward the valve and through the valve past the fuel intake to mix with the fuel entering there, the walls of the nozzle converging conically towards each other, restricting the bore of the nozzle rearwardly of the spark plug and forming a combustion chamber in the nozzle, the end of the nozzle bore located rearwardly of the restricted portion of the bore flaring outwardly.

RALPH G. PARR.
SAMUEL D. PARR.

REFERENCES CITED

The following references are of record in the file of this patent:

UNITED STATES PATENTS

| Number | Name | Date |
|---|---|---|
| 1,021,521 | Heroult | Mar. 26, 1912 |

FOREIGN PATENTS

| Number | Country | Date |
|---|---|---|
| 246,446 | Italy | Mar. 23, 1926 |